Oct. 18, 1927. 1,646,066
A. D. RICCIA
TRANSFORMING MACHINE WITH SYMMETRICALLY SUBDIVIDED FLUX FOR THE
CONTROL OF TRACTION MOTORS OR THE LIKE
Filed June 25, 1924

Inventor
Angelo Della Riccia

By Cushman Bryant & Clark
Attorney

Patented Oct. 18, 1927.

1,646,066

UNITED STATES PATENT OFFICE.

ANGELO DELLA RICCIA, OF BRUSSELS, BELGIUM.

TRANSFORMING MACHINE WITH SYMMETRICALLY-SUBDIVIDED FLUX FOR THE CONTROL OF TRACTION MOTORS OR THE LIKE.

Application filed June 25, 1924, Serial No. 722,384, and in France June 26, 1923.

This invention relates to systems of supply of electric current from a power circuit to interconnected electric translating devices, such as motors employed, for instance, for traction, lifting apparatus, rolling mills and the like.

An object of the invention is to provide a system or arrangement for this purpose which will operate with a minimum loss of energy in resistance or in braking, and with regeneration during braking or retardation.

A further object of the invention is to provide a system of this kind wherein the power circuit pressure is divided into a plurality of continuously variable fractions in balanced groups, with those of one group equal respectively to those of the other group, and is supplied to translating devices, in a gradually increasing or decreasing pressure, and wherein the braking can be effected to a complete stop. Still further objects are to provide such a system in which the energy proceeds as directly as possible from the power circuit to the translating devices, to diminish the number of parts and facilitate control of the translating devices to full speed and from full speed to a complete stop, and to effect such changes smoothly and with a minimum loss of energy.

The present invention relates to regulating systems of the type described in my copending application, Serial Number 519,558, filed December 2, 1921, and comprises improvements to the system shown in such application which obviate abrupt changes of current in the translating devices. As shown herein the translating devices are motors arranged in balanced groups and the present improvements provide simple means for preventing abrupt changes of current in the armatures of such motors, especially as they start operation as generators for braking purposes or for the recovery of power, and likewise for bringing such motors to a complete stop, without the provision of additional braking mechanism.

Further objects of the invention and the improvements which constitute the present invention will be apparent from the following specification and the accompanying drawings, in which:—

Fig. 1 is a diagrammatic view of circuits and apparatus constituting one embodiment of my invention;

Fig. 2 is a diagrammatic view of circuits and apparatus similar to Fig. 1 but showing certain of the motor-generator transformer fields connected to the power circuit through resistors and a reversing switch; and Fig. 3 is a diagrammatic view similar to Fig. 2 showing an equivalent connection to that in Fig. 2 of a certain motor-generator transformer field and the reversing switch.

As shown in Fig. 1 the system comprises a power circuit connected at the positive side to the point 10 and at the negative side to point 14. A transformer, of the motor-generator type, is in shunt with the line and has its armature divided into four parts $A_1$, $A'_2$, $A''_2$ and $A_3$ which are connected in series between points 10 and 14. The intermediate armature parts $A'_2$ and $A''_2$ may be formed as a single part if desired. The transformer fields for armature parts $A_1$ and $A_3$ are connected in series, and those for the intermediate armature part or parts are likewise in series, the fields for the end armature parts being connected in shunt with those for the intermediate armature part or parts and both likewise in shunt with all of the armature parts. As shown the fields are provided with resistors $r_1$, $r'_2$, $r''_2$, and $r_3$ respectively.

The translating devices herein shown are motor groups $M_1$ and $M_3$ with the elements of one group identical with those of the other group, to provide a balanced load, and each group is connected in a separate shunt with the elements of the group in parallel. The armatures of the motors of group $M_1$, are connected directly to the power circuit and the regulating machine or groups at the point 10, and those of the group $M_3$ at the point 14, and each of the motors has a field winding in series with its armature and comprising two parts indicated as $10'$—$11'$ and $11''$—$11'''$ in group $M_1$, and as $14'$—$13'$ and $13''$—$13'''$ in group $M_3$, one part of each field winding being permanently connected with its armature and the other part being connected thereto by switching means so that it may be connected in series during the starting and normal operation of the motor, but may be disconnected during braking and regeneration and connected with an exciter as will be later described.

The shunt line through the armature parts is tapped between the armature parts, as indicated at 11, 12 and 13, these points, as well as the power circuit points 10 and 14 being connected to symmetrically arranged contacts 5, 1, 2, 3, and 4, and 4', 3', 2', 1', and 5' of a double switch, the moving points of the switch indicated as $K_1$ and $K_3$ being movable together to contact with points 1 and 1' or points 2 and 2' or any similar pair. Contact point 4 is connected with point 14 of the power circuit, and point 4' to point 10 of the power circuit. Points 3 and 1' are connected to point 13 between armature parts $A''_2$ and $A_3$, and points 3' and 1 are connected to point 11 between armature parts $A_1$ and $A'_2$. Points 2 and 2' are connected to point 12 at the center of the intermediate armature part between $A'_2$ and $A''_2$. Additional contact points 5 and 5' are provided and are connected to the power circuit at points 10 and 14, respectively.

Switches $k^1$ and $k^3$, connected respectively to movable contact points $K_1$ and $K_3$, and switches $m^1$ and $m^3$, connected to points 11'' and 13'', are provided to connect field windings 11''—11''' and 13''—13''' either in or out of circuit with the permanently connected field windings 10'—11' and 13'—14'. The switch $k^1$ contacts with point $cd_1$ connected to point 11', or with point $ab_1$ connected to point 11''', while switch $k^3$ contacts with point $cd_3$ connected to point 13', or with point $ab_3$ connected to point 13'''. The switch $m^1$ contacts with point $cd'_1$ connected to an exciter E, or with point $ab'_1$ connected with point 11', while switch $m^3$ contacts with point $cd'_3$ connected to the opposite side of the exciter E or with point $ab'_3$ connected to point 13'. A switch F is also provided for connecting together points 11''' and 13''' of the motor field windings.

The separate exciter E, for exciting the field portions 11''—11''' and 13''—13''' of the operation motors $M_1$ and $M_3$, is mounted on the same shaft as the armature parts $A_1$, $A'_2$, $A_2$, $A_3$.

In describing the operation of the system as a whole, it is assumed that the two motor groups $M_1$ and $M_3$ are similar, and that the E. M. F.'s supplied to them are equal, the E. M. F.'s of the transformer parts $A_1$, $A'_2$, $A''_2$ and $A_3$ being represented by $e_1$, $e'_2$, $e''_2$ and $e_3$, respectively, and being regulated by the resistors $r_1$, $r'_2$, $r''_2$ and $r_3$ which determine the corresponding fluxes $\phi_1$, $\phi'_2$, $\phi''_2$ and $\phi_3$. Likewise the currents in the armature parts are represented by $i_1$, $i'_2$, $i''_2$ and $i_3$ respectively and the current in each group of motors by $i$, and it is assumed that flux $\phi_1$ is equal to flux $\phi_3$, that flux $\phi'_2$ is equal to flux $\phi''_2$, that current $i_1$, in $A_1$, is equal to current $i_3$ in $A_3$, that current $i'_2$ is equal to current $i''_2$, and that $e_1$ is equal to $e_3$ and $e'_2$ to $e''_2$. The operation may be divided into four periods for convenience of description, two starting periods and two braking periods which will be hereafter referred to as periods $a$, $b$, $c$ and $d$.

($a$) First period of starting.

The motors $M_1$ and $M_3$ are switched into the circuit by placing switches $K_1$ and $K_2$ upon contacts 1 and 1', the switches $k^1$ and $k^3$ being on contacts $ab_1$ and $ab_3$, respectively, switches $m^1$ and $m^3$ being on contacts $ab'_1$ and $ab'_3$, respectively, and switch F being open. The motors $M_1$ and $M_3$, including field portions 11''—11''' and 13''—13''', are thus connected in shunt with the end armatures $A_1$ and $A_3$, respectively, from points 10 to 11 and from points 13 to 14. In order to provide a first minimum starting value of the fluxes $\phi_1$, $\phi_3$, the rheostats $r_1$, $r_3$, by means of which said fluxes $\phi_1$, $\phi_3$ (which are equal in respect of each other) are regulated, are first placed on the first contact, while $r'_2$ and $r''_2$ contrarily are placed so as to provide the maximum value of $\phi'_2$ and $\phi''_2$. The equal fluxes $\phi_1$, $\phi_3$ subsequently are increased, or the equal fluxes $\phi'_2$ and $\phi''_2$ are decreased to supply to the motors $M_1$ and $M_3$ the two E. M. F.'s $e_1$ and $e_3$ which are always equal and greater than their proper counter E. M. F. Parts $A_1$ and $A_3$ of the transformer device act as generators, and parts $A'_2$ and $A''_2$ as motors, the power circuit supplies to the motors $M_1$ and $M_3$ and the transforming device a current which (neglecting the currents $i_0$ representing transformer losses) is equal to the difference between $i_1$ and $i$, and power which increases from zero to $Vi$, each motor or group of motors $M_1$ and $M_3$ absorbing power which increases from zero to $\frac{Vi}{2}$. At the end of this period, the two groups of motors may be connected in series with each other by placing switch contacts $K_1$ and $K_3$ on contacts 2 and 2' which lead to the middle point 12 of the transforming device.

($b$) Second period of starting.

The switches $K_1$ and $K_3$ are placed upon contacts 3 and 3', so that the motor group $M_1$ is connected between points 10 and 13, and group $M_3$ between points 11 and 14. The equal fluxes $\phi_1$ and $\phi_3$ are decreased, or the equal fluxes $\phi'_2$ and $\phi''_2$ are increased, so that the motor groups will still be supplied with equal E. M. F.'s, $e_1 + e'_2 + e''_2$ and $e'_2 + e''_2 + e_3$ which are always greater than their proper counter E. M. F.'s. Parts $A_1$ and $A_3$ of the transforming device now act as motors and parts $A'_2$ and $A''_2$ as generators, the power circuit supplying power which increases from $Vi$ to $2Vi$, and each of the motor groups $M_1$ and $M_3$ absorbing power which increases from $\frac{Vi}{2}$ to $Vi$. At the end of this period, which completes the starting period, the motor groups $M_1$ and $M_3$ may be connected in parallel by placing switches $K_1$ and $K_3$ on contacts 4 and 4', each being thus connected to the power circuit between points 10 and 14.

From this moment the motors $M_1$ and $M_3$ operate according to their characteristics at voltage V.

The motors of the groups $M_1$ and $M_3$, being supposed to be series wound motors with their field windings cut in two parts $10'$—$11'$ and $11''$—$11'''$ for the motors of the group $M_1$, and in $14'$—$13'$ and $13''$—$13'''$ for the motors of the group $M_3$, are suitably excited by the auxiliary exciter E, to enable them to operate reliably as generators, would be capable (in addition to the braking effect which they might produce in parallel in accordance with their characteristics at constant voltage V) of producing a braking effect according to the two following periods.

(c) First braking period.

The switches $K_1$ and $K_3$ are placed on contacts 3 and $3'$, switches $k^1$ and $k^3$ are placed on contacts $cd_1$ and $cd_3$, switches $m^1$ and $m^3$ are placed on contacts $cd'_1$ and $cd'_3$, and switch F is closed. The motors of groups $M_1$ and $M_3$ are thus, with their permanently connected field portions $10'$—$11'$ and $14'$—$13'$, connected between points 10 and 13 and points 11 and 14, respectively, while the field portions $11''$—$11'''$ and $13''$—$13'''$ are connected in series with each other and with the exciter E. The equal fluxes $\phi_1$ and $\phi_3$ are increased, or the equal fluxes $\phi'_2$ and $\phi''_2$ are decreased, so as to supply to the motors of groups $M_1$ and $M_3$, now acting as generators, two counter E. M. F.'s $e_1 + e'_2 + e''_2$ and $e'_2 + e''_2 + e_3$ which are always equal and somewhat below their proper E. M. F.

During the starting periods and normal working the field winding portions $10'$—$11'$ and $11''$—$11'''$, and likewise parts $14'$—$13'$ and $13''$—$13'''$, were acted upon by the same magnetizing current (the current taken by the motor). During the braking periods, on the contrary, the field winding portions $10'$—$11'$ and $14'$—$13'$ are acted upon by a demagnetizing current (the current supplied by the motors acting as generators) while the portions $11''$—$11'''$ and $13''$—$13'''$ are acted upon by the magnetizing current supplied by exciter E which is driven by the transforming device.

The action, as a whole, is similar to that which takes place during the second period of starting, except that the fluxes change in the opposite direction, that part of the field windings of the motors $M_1$ and $M_3$ are differently excited, and that $i_0$ is greater by reason of the added losses in the auxiliary exciter E. At the end of the period the switches $K_1$ and $K_3$, may be moved to contacts 2 and $2'$.

(d) Second braking period.

Switches $K_1$ and $K_3$ are placed on contacts 1 and $1'$, the other switches being left in the positions shown in the drawings, that is, the positions described for the first braking period. The motor groups $M_1$ and $M_3$ are thus connected between points 10 and 11 and points 13 and 14, respectively; and the equal fluxes $\phi_1$ and $\phi_3$ are decreased, or the equal fluxes $\phi'_2$ and $\phi''_2$ are increased so as to supply to the groups of motors $M_1$ and $M_3$ which are now acting as generators, two counter E. M. F.'s $e_1$ and $e_3$ which are always equal and somewhat less than their proper E. M. F. The action, as a whole, is similar to that which takes place during the first period of starting except for the differences which have been indicated above. At the end of this period the regulating rheostats $r_1$ $r_3$ consequently are returned on their first contact corresponding to the minimum positive value of the fluxes $\phi_1$ $\phi_3$ (i. e. their minimum starting value).

During the starting, the current $i$ is regulated by controlling, by means of the transforming device, the excess of voltage supplied to the motors of groups $M_1$ and $M_3$ in relation to the counter E. M. F. which they produce at the instant speed. During the braking, the regulation is carried out in a similar manner by adjusting the decrease of voltage supplied to the motors in relation to the same contour E. M. F. The motors may be started and braked at constant current, or with variable current, as may be desired.

The object of the present invention is to provide modifications or additions to said transformer and to its connections in order to obtain up to the end of the material braking operation an uninterrupted electric braking, and finally the complete stop of the motors without having recourse to a separate braking system or to additional safety means.

The invention essentially provides said transformer with means allowing to continue the variations of the two pairs of partial fluxes, in the same manner as during the second braking period but surpassing the stage attained at the end of said second braking period. A first progress along these lines for obtaining effective braking at the end of the braking period consists, after reducing to the minimum initial starting value the fluxes $\phi_1$ and $\phi_3$, and raising to the corresponding values the fluxes $\phi'_2$ and $\phi''_2$ either by reducing to naught the two partial fluxes $\phi_1$ and $\phi_3$ and increasing the partial fluxes $\phi'_2$ and $\phi''_2$ to half the value of the total flux (if constant) so as to short-circuit incompletely the armatures of the motors $M_1$ and $M_3$ on the ohmic resistances of the end windings $A_1$ and $A_3$; or in short-circuiting the armatures of said motors which are excited by the auxiliary exciter E. To this effect a fifth position 5 and $5'$ respectively is provided for the double switch $K_1$ and $K_3$ said position connecting point $11'$ of the motor group $M_1$ to point 10, and point $13'$ of the motor group $M_3$ to point 14, thus short circuiting the armatures of the motors $M_1$ and $M_3$ (Figs. 1, 2 and 3).

A further and more complete progress along these lines consists in that the direction of the fluxes $\phi_1$ and $\phi_3$ can be reversed (raising simultaneously and in the same proportion the values reached by the fluxes $\phi'_2$ and $\phi''_2$ in order always to keep the algebraic sum of the four fluxes substantially constant if it is desired to keep constant the speed of the transformer and the exciter E). To obtain the reversing of the two fluxes $\phi_1$ and $\phi_3$, the invention provides an additional reversing switch G, by means of which the current in the field windings and in the field rheostats acting on the extreme armatures or armature parts $A_1$ and $A_3$, may be reversed. To produce the corresponding raise of the fluxes $\phi'_2$ and $\phi''_2$ it will be sufficient to accordingly dimension the field windings and the field rheostats acting on the intermediate armatures or armature parts $A'_2$ and $A''_2$.

Figs. 2 and 3 show two equivalent connections of the reversing switch in that field circuit of the transformer which has to regulate the fluxes $\phi_1$ and $\phi_3$, fluxes which are to be reversed in order to stop the motors.

When the switch G is moved to reverse the direction of the fluxes in the armature parts $A_1$ and $A_3$, these latter, being excited in the opposite direction, will cease to act as motors and will act as generators, thus supplying to the motors of groups $M_1$ and $M_3$ currents which (being situated in the magnetic field produced by the exciter E) will set up torques which will be opposite to the forward movement of the train and will last as long as desired, independently of the speed of the armatures of the motors of groups $M_1$ and $M_3$. In this manner the motors can be braked electrically and completely to a stop and may even be reversed the necessary power being taken from the power circuit in the latter case.

The term "minimum starting value of the fluxes $\phi_1$ and $\phi_3$," used in the preceding description and claims hereafter is to be understood to designate those values, which between the terminals of the armatures or armature parts $A_1$ and $A_3$ produce the pressures $e_1$ and $e_3$ adapted to throw the normal starting current in the armatures of the motors $M_1$ and $M_3$ while the latter are at rest, i. e. without any counter E. M. F.

Having thus particularly described the nature of my said invention and in what manner the same is to be performed, what I claim is:—

1. The combination with a main distributing line, and balanced groups of motors having subdivided field windings of a motor-generator transformer having end and intermediate armatures connected in series across the line, an exciter, means connecting said exciter to a portion of each of said motor field windings, means for short circuiting the armatures of said motors, field windings for said end armatures, field windings for said intermediate armatures, means for varying the fluxes generated by said field windings, and means for reversing the direction of the current in the field windings of said end armatures.

2. In an installation of electric motors fed at variable pressure from a direct current distributing line under substantially constant pressure, comprising a transformer for direct current having two end armature windings and other intermediate armature windings mounted on the same shaft and connected in series between the two terminals of the distributing line, said two end windings on the one hand, and said intermediate windings on the other hand being equal and symmetrically disposed in respect of said two terminals of the line, and further having fields arranged for producing two equal partial fluxes through the two end windings and two other equal partial fluxes through the two intermediate windings in relation to the first mentioned fluxes, and further comprising motors divided into two equal groups, the exterior terminals of which are connected to the exterior or end terminals of said transformer, and the inner terminals of which may be connected at variable points between the armatures of the transformer, and means to bring the partial fluxes of the end armatures from a minimum starting value to a maximum value and to cause a variaiton in the opposite direction of the fluxes of the intermediate armatures, the combination of means to continue during braking the variation of the partial fluxes in the end armature parts below said minimum starting value in order, without regeneration of energy, to secure electric braking until the complete stop of the motor.

3. In an installation of electric motors comprising a transformer for direct current having two end armature windings and other intermediate armature windings mounted on the same shaft and connected in series between the two terminals of the distributing line, said two end windings on the one hand, and said intermediate windings on the other hand being equal and symmetrically disposed in respect of said two terminals of the line, and further having fields arranged for producing two equal partial fluxes through the two end windings and two other equal partial fluxes through the two intermediate windings in relation to the first mentioned fluxes, and further comprising motors divided into two equal groups, the exterior terminals of which are connected to the exterior or end terminals of said transformer, and a double switch with several positions to connect the inner terminals of both said groups of motors at variable points between the armatures of the transformer, and further comprising means to bring the partial fluxes of the end armatures from a minimum starting value to a maximum value and to cause a variation in the opposite direction of the fluxes of the intermediate armatures, the combination of supplementary contacts on said double switch by which, at the end of the braking phase, both said motor groups are short-circuited in themselves in regard of the end armature parts of the transformer.

4. In an installation of electric motors, comprising a transformer for direct current having two end armature windings and other intermediate armature windings mounted on the same shaft and connected in series between the two terminals of the distributing line, said two end windings on the one hand, and said intermediate windings on the other hand being equal and symmetrically disposed in respect of said two terminals of the line, and further having fields arranged for producing two equal partial fluxes through the two end windings and two other equal partial fluxes through the two intermediate windings in relation to the first mentioned fluxes, and further comprising motors divided into two equal groups, the exterior terminals of which are connected to the exterior or end terminals of said transformer, and means to connect the inner terminals of both said groups of motors at variable points between the armatures of the transformer, and further means to bring the partial fluxes of the end armatures from a minimum starting value to a maximum value and to cause a variation in the opposite direction of the fluxes of the intermediate armatures, the combination of a reversing switch in the circuits of the field windings corresponding to the two end parts of the transformer to allow the reversing of the current in said fields and consequently of the partial fluxes in said extreme armature parts.

5. In an installation of electric motors, comprising a transformer for direct current having two end armature windings and other intermediate armature windings mounted on the same shaft and connected in series between the two terminals of the distributing line, said two end windings on the one hand, and said intermediate windings on the other hand being equal and symmetrically disposed in respect of said two terminals of the line, and further having fields arranged for producing two equal partial fluxes through the two end windings and two other equal partial fluxes through the intermediate windings in relation to the first mentioned fluxes, and further comprising motors divided into two equal groups, the exterior terminals of which are connected to the exterior or end terminals of said transformer, and a double switch with several positions to connect the inner terminals of both said groups of motors at variable points between the armatures of the transformer, and means to bring the partial fluxes of the end armatures from a minimum starting value to a maximum value and to cause a variation, in the opposite direction, of the fluxes of the intermediate armatures, the combination of supplementary contacts on said double switch by which, at the end of the braking phase, both said motor groups are short-circuited in themselves in regard of the end armature parts of the transformer and of a reversing switch in the circuits of the field windings corresponding to the two end parts of the transformer to allow the reversing of the current in said fields and consequently of the partial fluxes in said extreme armature.

In testimony whereof I have signed my name to this specification.

ANGELO DELLA RICCIA.